(12) United States Patent
Guo

(10) Patent No.: US 8,485,561 B2
(45) Date of Patent: Jul. 16, 2013

(54) COMBINED STRUCTURE USED FOR AIR-CONDITIONING VENTILATION

(75) Inventor: Jincai Guo, Shanghai (CN)

(73) Assignee: Shanghai Yinda Air Conditioning Enterprise Co., Ltd., Shanghai (CN)

( * ) Notice: Subject to any disclaimer, the term of this patent is extended or adjusted under 35 U.S.C. 154(b) by 0 days.

(21) Appl. No.: 13/400,594

(22) Filed: Feb. 21, 2012

(65) Prior Publication Data

US 2013/0049352 A1  Feb. 28, 2013

Related U.S. Application Data

(63) Continuation of application No. PCT/CN2010/001587, filed on Oct. 11, 2010.

(30) Foreign Application Priority Data

Aug. 4, 2010  (CN) ...................... 2010 2 0281820 U

(51) Int. Cl.
  *F16L 41/00* (2006.01)
(52) U.S. Cl.
  USPC ........................... 285/133.11; 285/4; 285/921
(58) Field of Classification Search
  USPC ................. 285/4, 3, 133.11, 133.3, 921, 903
  See application file for complete search history.

(56) References Cited

U.S. PATENT DOCUMENTS

| | | | | | |
|---|---|---|---|---|---|
| 2,449,754 | A | * | 9/1948 | Seitz | 285/4 |
| 2,908,744 | A | * | 10/1959 | Bollmeier | 285/3 |
| 3,695,643 | A | * | 10/1972 | Schmunk | 285/133.3 |
| 3,825,288 | A | * | 7/1974 | Maroschak | 285/921 |
| 4,247,136 | A | * | 1/1981 | Fouss et al. | 285/921 |
| 4,286,808 | A | * | 9/1981 | Fouss et al. | 285/921 |
| 5,222,334 | A | * | 6/1993 | Hasty | 285/4 |
| 5,277,459 | A | * | 1/1994 | Braun et al. | 285/903 |
| 5,689,921 | A | * | 11/1997 | Carlton | 285/903 |
| 6,044,591 | A | * | 4/2000 | Hegler | 285/903 |
| 7,871,109 | B1 | * | 1/2011 | McKinnon et al. | 285/133.3 |

FOREIGN PATENT DOCUMENTS

| | | |
|---|---|---|
| AU | 630256 B | 10/1992 |
| AU | 2087499 A1 | 11/1999 |
| CN | 2818991 Y | 9/2006 |
| CN | 2854423 Y | 1/2007 |
| CN | 201141498 Y | 10/2008 |

* cited by examiner

Primary Examiner — David E Bochna

(57) ABSTRACT

A combined structure for air-conditioning ventilation comprises a tee connector (1), an easy connector (40), and a caliber adapter (30). The tee connector (1) comprises a tubular adjustable part (10) at its cylindrical tube (3) for outflow ventilation. The caliber adapter (30) may be installed at the inflow cylindrical tube (14) of the tee connector (1). By clamping the snap-fit points of the easy connector (40) into the snap-fit points (7) that is located on a first cylindrical tube (3) of the tee connector (1), the easy connector (40) may be installed at the first cylindrical tube (3). The resulting combined structure can be easily installed and used, and can have its parts easily switched.

10 Claims, 8 Drawing Sheets

COMBINED STRUCTURE USED FOR AIR-CONDITIONING VENTILATION

CROSS-REFERENCE

This application is a continuation application of International Application No. PCT/CN2010/001587, filed on Oct. 11, 2010, which claims priority to Chinese Patent Application No. 201020281820.X, filed on Aug. 4, 2010, both of which are hereby incorporated by reference in their entireties, including any appendices or attachments thereof, for all purposes.

TECHNICAL FIELD

The present disclosure relates to a combined structure using a tee connector, an easy connector, and/or a caliber adapter configured for air-conditioning ventilation.

BACKGROUND

With the improvement of living standards, it becomes common for large buildings to use air-conditioning system. A tee connector, an easy connector, and/or a caliber adapter for air-conditioning ventilation, as well as the combination of these parts, are important parts of an air-conditioning ventilation system.

Conventional tee connector, or commonly referred to as a tee, is often made of metal or plastic. For a conventional tee connector that is used for connecting with an outflow ventilation pipe of an air-conditioner, its caliber is usually unadjustable. Therefore, it is not easy for the conventional tee connector to be connected with some of the soft ventilation pipes, which not only causing difficulty in installation, but also failing to guarantee the correct installation of the air conditioner. Often times during the installation of the air-conditioning system, the caliber of the ventilation pipe is different from the pre-designated or pre-estimated diameters of the soft ventilation pipe. In this case, a caliber adapter may be required.

Due to its heavy weight, the conventional metal caliber adapter cannot easily be connected with the conventional tee connector. So the conventional caliber adapter is seldom used for directly connecting with the conventional tee connector. Thus, when there are changes to the design or during construction, the diameter of the soft ventilation pipe may be changed, resulting in the diameter of the soft ventilation pipe no longer matching the caliber of the tee connector. In this case, the tee connector may need to be changed as well, which could lead to wastes in time, money, and labor, and increases in the construction costs.

Furthermore, the ventilation pipe for the air-conditioner is often located at a height that is not easily accessible. The connection between two ventilation pipes of the air-conditioner is often secured by metal rings or some kind of bands. The connections among the soft ventilation pipe of the air-conditioner, the air box, the tee connector, and the blower are also fixed by bands. With the weight of the traditional caliber adapter being heavy, and the securing of the conventional caliber adapter with the soft ventilation pipe being difficult, there may be safety and air-leaking concerns. To ensure safety, the connections among these pipes, the air-collecting compartments, the tee connector, and the air-blower may need improvements in order to reduce construction hazard.

SUMMARY

Accordingly, various aspects of present disclosure may provide a combined structure having a tee connector, an easy connector, and a caliber adapter. The combined structure may be used for connecting various ventilation pipes for an air-conditioning system. The combined structure may also be used to connect the ventilation pipes, the air-collecting compartment, and the air-blower of an air-conditioning system.

One aspect of present disclosure may provide a combined structure used for ventilation pipe of an air-conditioner, comprises a tee connector (1), an easy connector (40) and a caliber adapter (30), wherein the tee connector (1) comprises a cylindrical tube (3) and a first tubular adjustable part (10) located at one end of the cylindrical tube (3), wherein the first tubular adjustable part (10) is adjustable for connecting with an outflow ventilation pipe.

The first tubular adjustable part (10) comprises a tear buckle (11) and a conical tube (12) configured for adjusting the first tubular adjustable part (10), a small end of the conical tube (12) is connected with a transitional conical tube (17), wherein a first outflow cylindrical tube (4) is connected with a small end of the transitional conical tube (17), has a smaller diameter than the cylindrical tube (3), and is configured to be tear-off and removed from the conical tube (12).

The first outflow cylindrical tube (4) comprises a second tubular adjustable part (20) for connecting with the outflow ventilation pipe, wherein the second tubular adjustable part (20) contains a second outflow cylindrical tube (5) which has a smaller diameter than the first outflow cylindrical tube (4) and is configured to be tear-off and removed from the second tubular adjustable part (20).

The easy connector (40) have a cylindrical body (410) with a diameter corresponding to the outflow ventilation pipe's diameter, wherein an outer surface of the easy connector (40) contains a snap-fit structure (41), and a middle section of the cylindrical body (410) is fitted with a sealing cylindrical ring (47).

On one side of the sealing cylindrical ring (47) the cylindrical body (410) has on its surface a snap-fit point (42), on another side of the sealing cylindrical ring (47) the cylindrical body (410) has on its surface a two-step cylindrical structure (48) for easy connection.

The two-step cylindrical structure (48) has a first section and a second section, with the first section having a smaller outer-diameter than the second section, the first section has on its outer surface a snap-fit point (46), and the second section has on its outer surface an elastic snap-fit point (45).

The caliber adapter (30) is formed by a large-diameter tube and a small-diameter tube which are connected by a transitional conical tube (35), the small-diameter tube has on its outer surface a two-step outer cylindrical structure (36) formed by a third section and a fourth section, the third section's outer diameter is smaller than the fourth section's outer diameter, the third section has on its outer surface an elastic snap-fit point (31), and the fourth section has on its outer surface an snap-fit point (32) for connecting with the soft pipe.

The large-diameter tube has on its inner surface a two-step inner cylindrical structure (37) formed by a fifth section and a sixth section, the fifth section's inner diameter is larger than the sixth section's inner diameter, the sixth section has on its outer surface an elastic snap-fit point (33) for connecting with the soft pipe, and the fifth section has on its outer face a rectangular slot (34).

And the easy connector (40) is connected with the cylindrical tube (3), and the caliber adapter (30) is connected with an inflow cylindrical tube (14) of the tee connector (1).

BRIEF DESCRIPTION OF THE DRAWINGS

To clarify the present disclosure, the accompanying drawings for the various embodiments are briefly described below.

Figure 1:
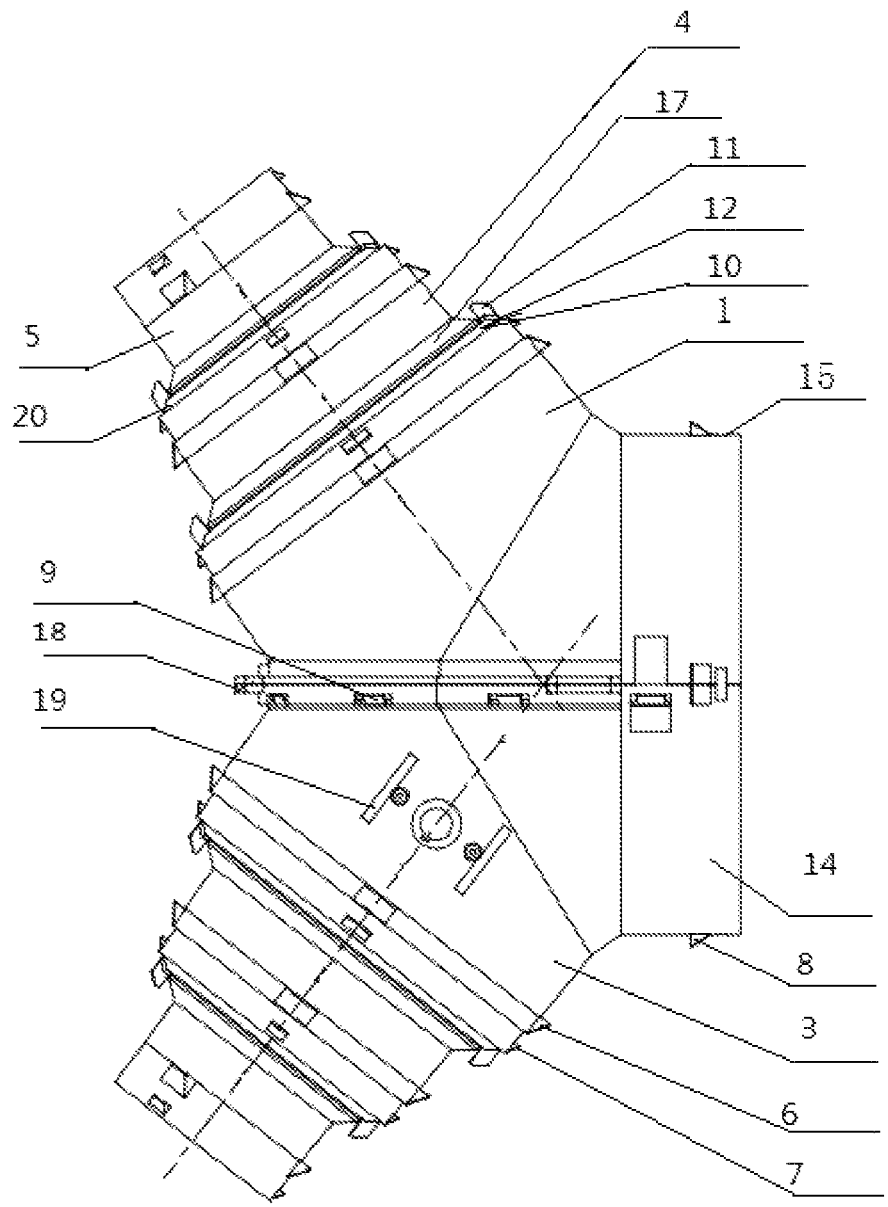
FIG. 1 shows a main view of one embodiment of a tee connector having a tubular adjustable part which can be tear-off and removed, and fitting structures that can be used to form a combined structure.
Figure 2:
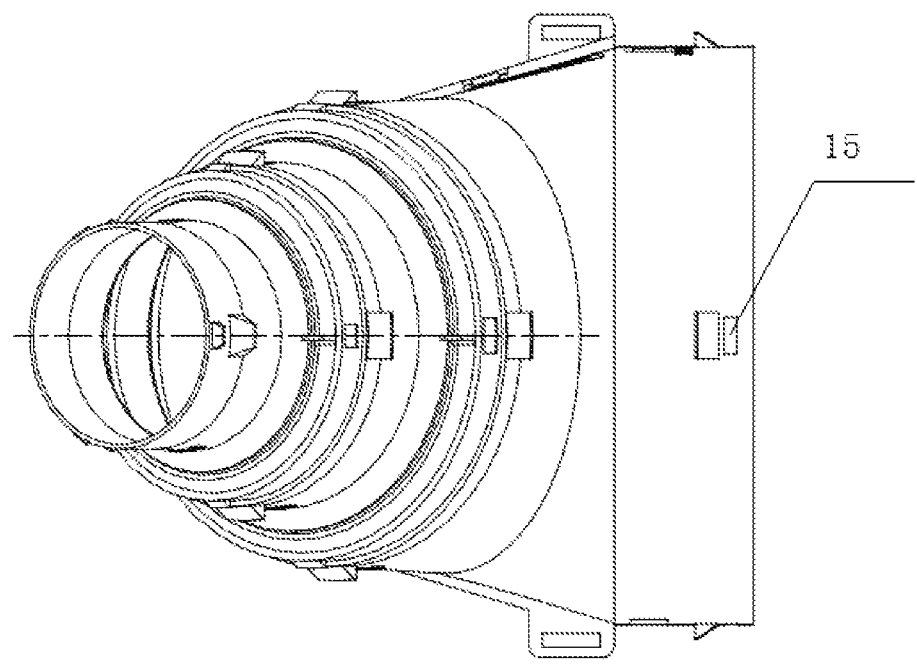
FIG. 2 shows a top view of one embodiment of a tee connector having a tubular adjustable part which can be tear-off and removed, and fitting structures that can be used to form a combined structure.
Figure 3:
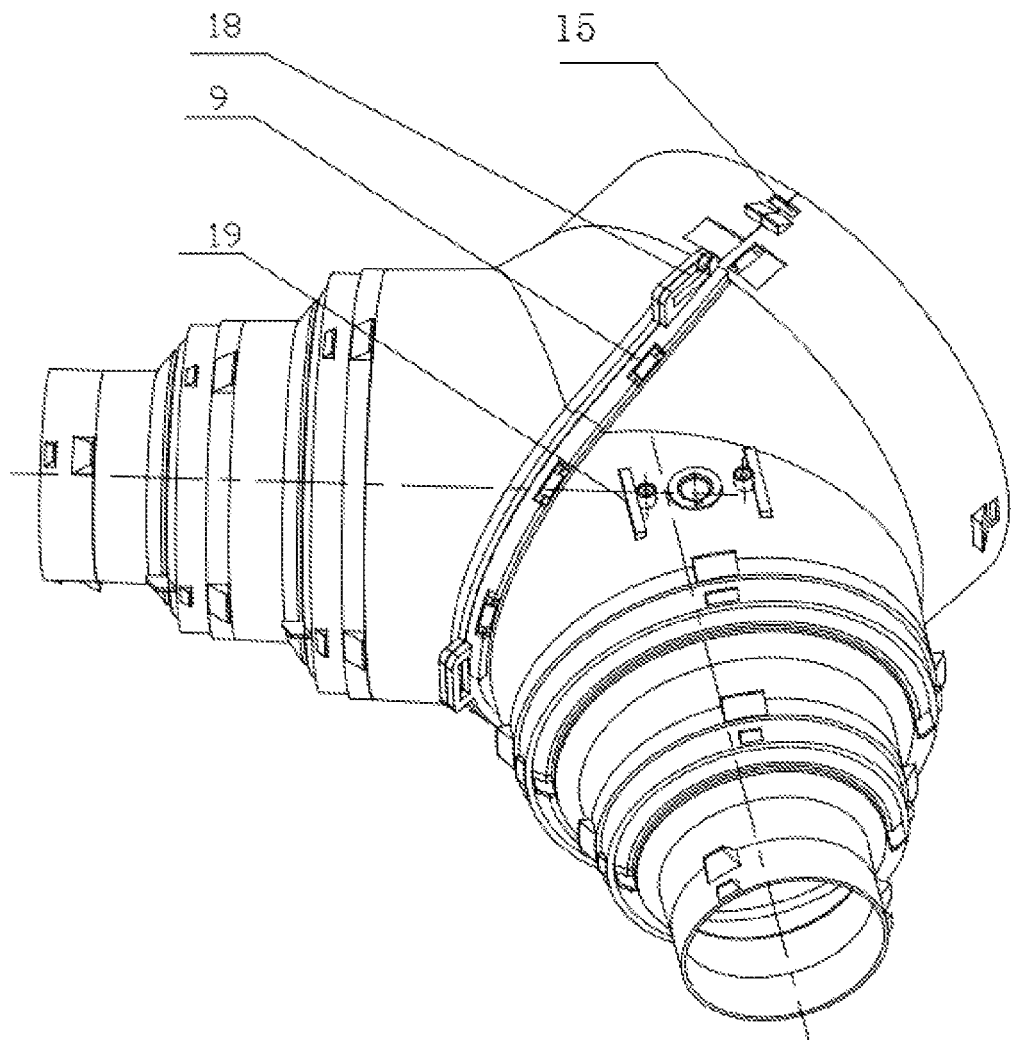
FIG. 3 shows a three-dimensional view of one embodiment of a tee connector having a tubular adjustable part which can be tear-off and removed, and fitting structures that can be used to form a combined structure.
Figure 4:
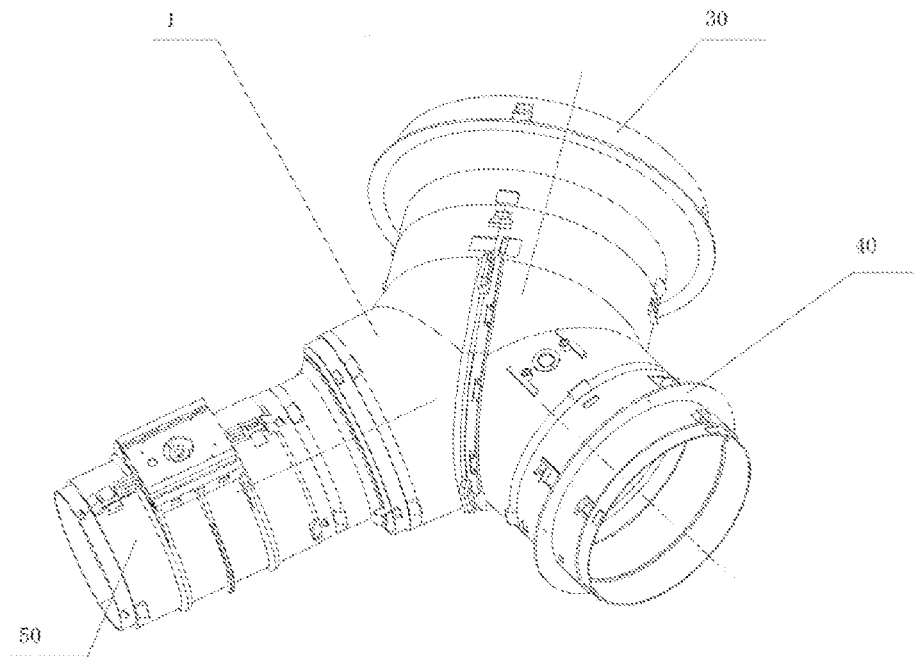
FIG. 4 shows a three-dimensional view of one embodiment of a combination structure which comprises a tee connector, a caliber adapter, an easy connector, and an air door.
Figure 5:
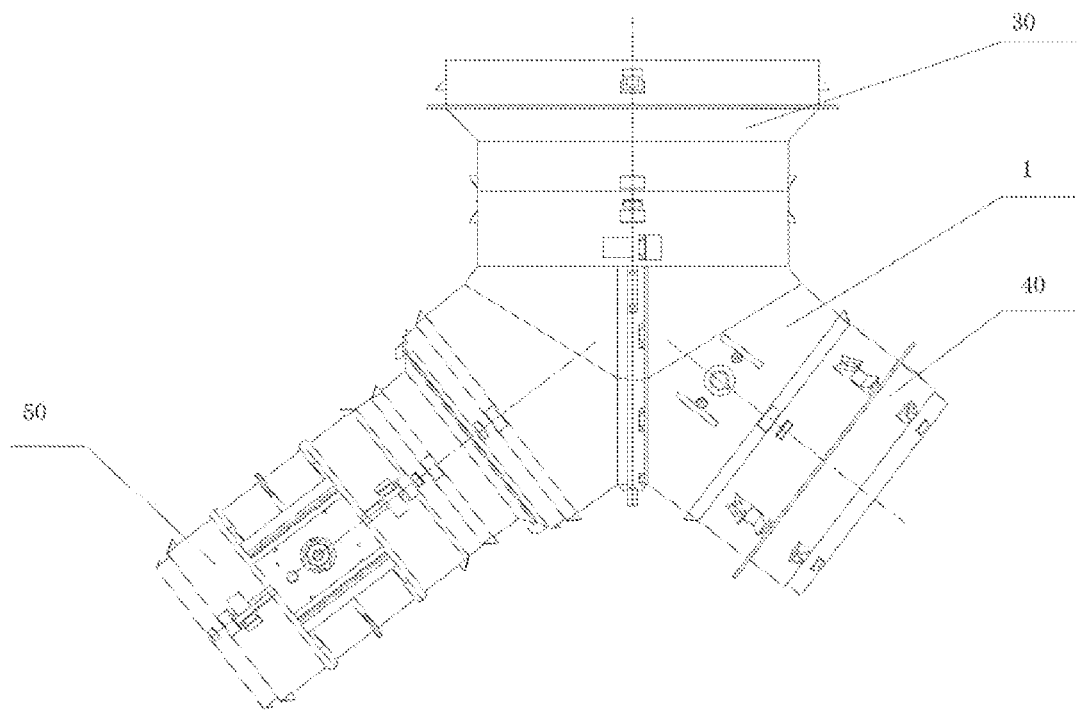
FIG. 5 shows a main view of one embodiment of the combined structure as illustrated in FIG. 4.
Figure 6:
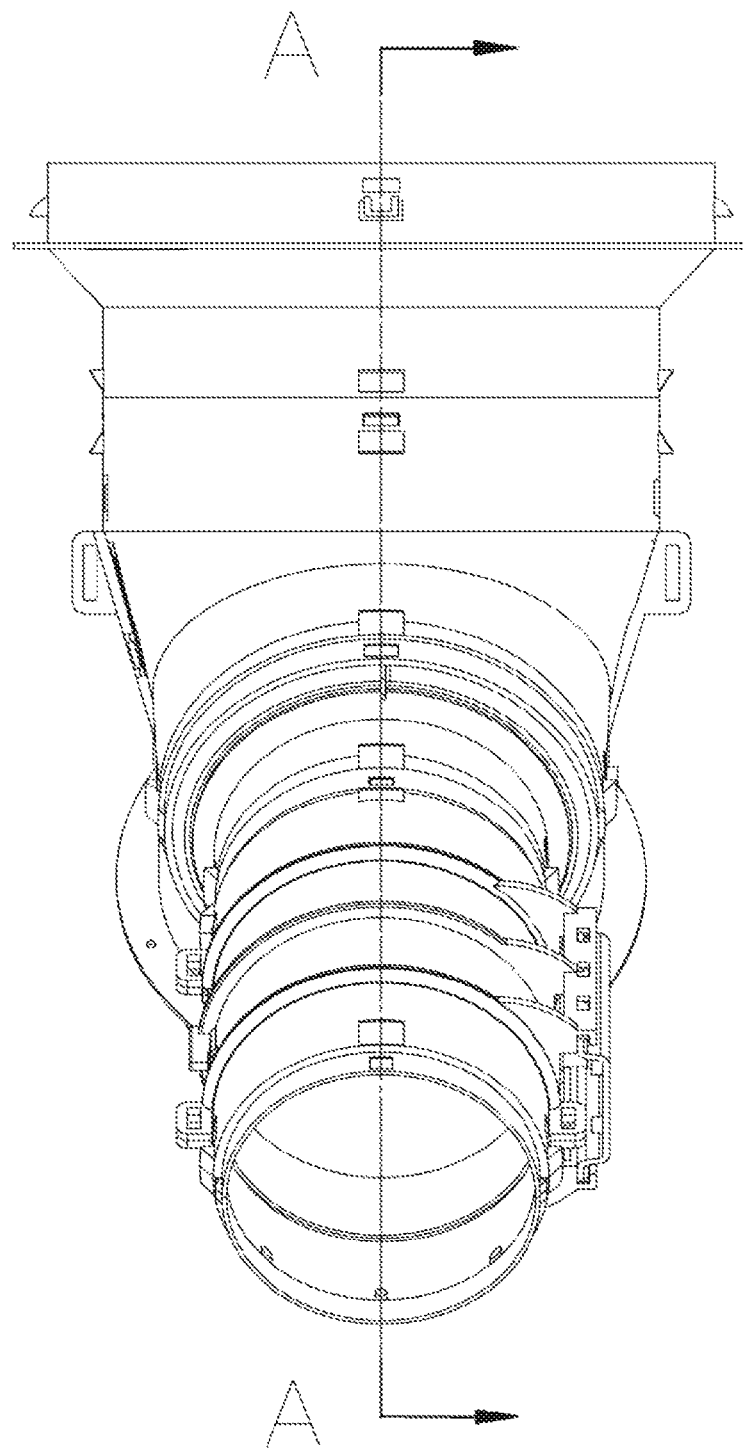
FIG. 6 shows a left view of one embodiment of the combined structure as illustrated in FIG. 4.
Figure 7:
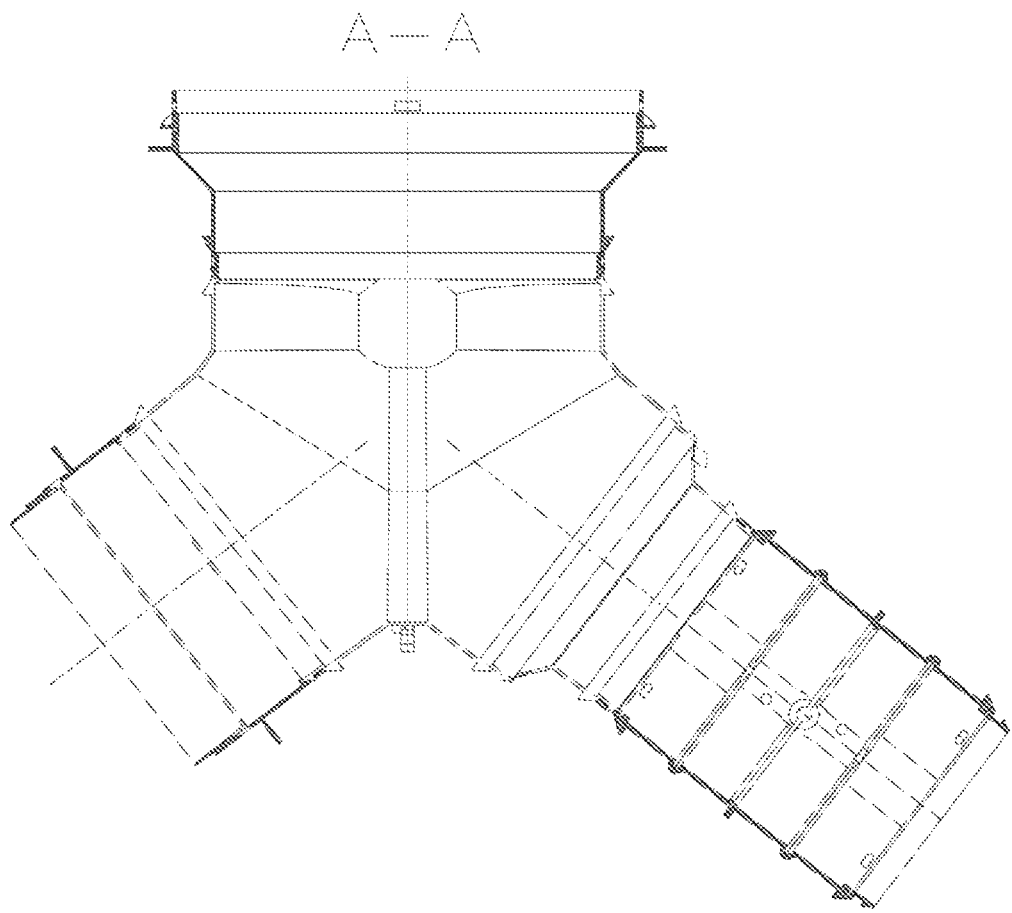
FIG. 7 shows a left-intersection view of one embodiment of the combined structure as illustrated in FIG. 6.
Figure 8:
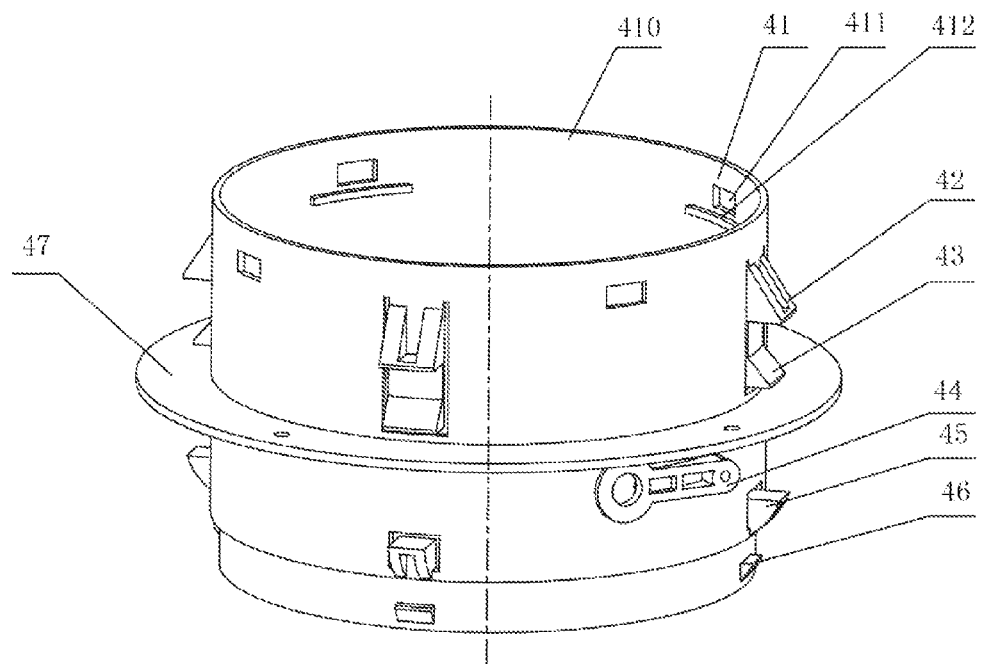
FIG. 8 shows a three-dimensional view of one embodiment of an easy connector for a combined structure.
Figure 9:
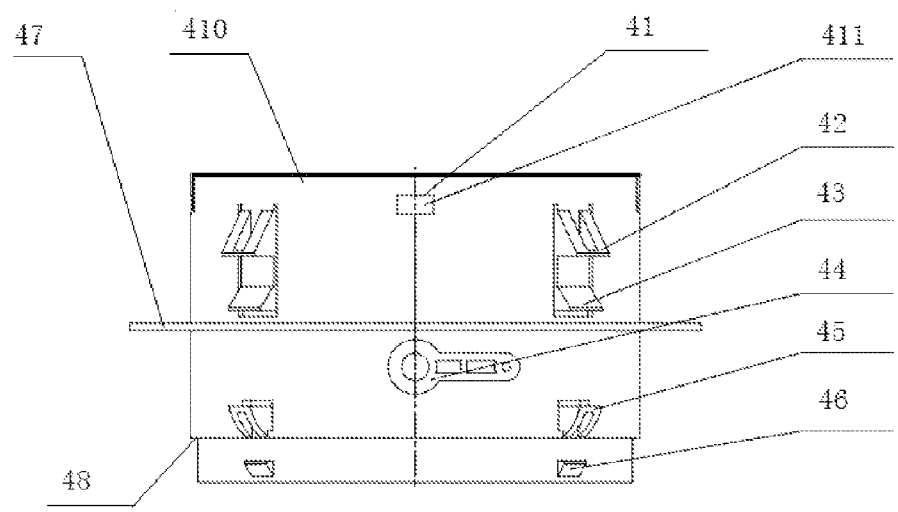
FIG. 9 shows a main view of one embodiment of the easy connector for the combined structure, as illustrated in FIG. 8.
Figure 10:
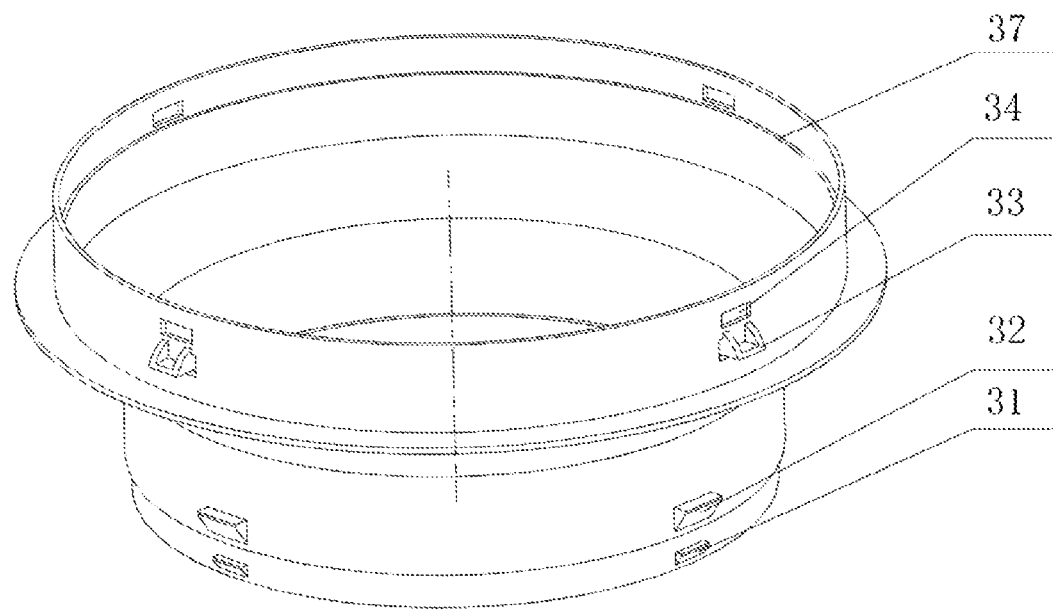
FIG. 10 shows a three-dimensional view of one embodiment of a caliber adapter for the combined structure.
Figure 11:
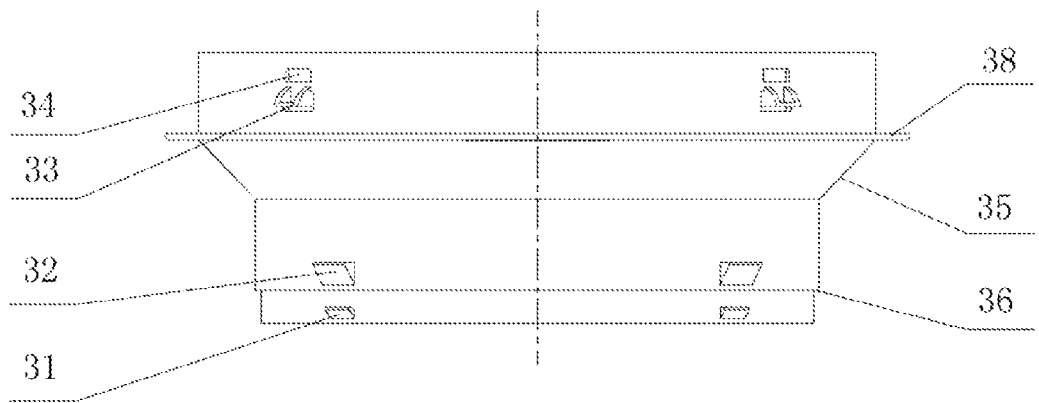
FIG. 11 shows a main view of the caliber adapter for the combined structure, as illustrated in FIG. 10.

The various marks in the above figures may be referring to:
1, tee connector;
10, a first tubular adjustable part;
11, tear buckle;
12, a conical tube which can be tear-off and removed;
3, a cylindrical tube;
4, an outflow cylindrical tube which can tear-off and removed with the first tubular adjustable part 10;
20, a second tubular adjustable part;
5, an outflow cylindrical tube which can tear-off and removed with the second tubular adjustable part 20;
6, a snap-fit point located on the outer surface of the cylindrical tube 3, and can be used for connecting with a soft ventilation pipe;
7, a snap-fit point located on the outer surface of the cylindrical tube 3, and can be used for connecting with an easy connector 40, an electronic air door, or an air-blower;
8, a snap-fit point located on the outer surface of the inflow cylindrical tube 14, and can be used for connecting with a reducer;
14, an inflow cylindrical tube;
15, a slot in the wall of the inflow cylindrical tube 14;
17, a transitional conical tube;
18, a hanging handle;
19, a fastening structure for a control switch of an air block panel;
30, a caliber adapter that can be connected with the inflow cylindrical tube
14 of the tee connector 1;
31, a snap-fit point located on the caliber adapter 30 and can be used for connecting the tee connector 1 or an air door;
32, a snap-fit point located on the caliber adapter 30 and can be used for connecting a soft pipe;
33, an elastic snap-fit point located on the caliber adapter 30 and can be used for connecting a soft pipe;
34, a rectangular slot in the wall of the caliber adapter 30 that can be used for clamping the tee connector or the air door;
35, a transitional conical tube of the caliber adapter 30;
36, a two-step cylindrical structure located on the outer surface of the caliber adapter 30;
37, a two-step cylindrical steps structure located at the inner surface of the caliber adapter 30;
38, a sealing cylindrical ring for the caliber adapter 30;
40, an easy connector that can be connected with the outflow cylindrical tube of the tee connector 1;
41, a snap-fit structure located on the easy connector 40 and can be used for connecting a reducer, the tee connector 1, the air door, and/or the air blower;
42, an elastic snap-fit point of the snap-fit structure 41 used for clamping a thick air-collecting compartment or a soft ventilation pipe;
43, an elastic snap-fit point of the snap-fit structure 41 used for clamping a thin air-collecting compartment or a soft ventilation pipe;
44, a fastening structure for a control switch of an air block panel;
45, a snap-fit point located on the easy connector 40 and can be used for clamping a soft ventilation pipe;
46, a snap-fit point located on the easy connector 40 and can be used for clamping the tee connector 1, the air door, and/or the air blower;
47, a sealing cylindrical ring of the easy connector 40;
48, a two-step cylindrical structure of the easy connector 40;
410, a body of the cylindrical pipe of the easy connector 40;
411, a rectangular slot of the easy connector 40;
412, a stop block of the easy connector 40; and
50, an electric air door used for connecting with an outflow cylindrical tube of the tee connector 1.

DETAILED DESCRIPTION

To clarify the present disclosure, the following description and the accompanying drawings illustrate the embodiments of the present disclosure.

Embodiment 1, A Tee Connector with Adjustable Parts, which can be Tear-off and Removed for Diameter Adjustments, and Snap-fit Points.

In one embodiment, the tee connector 1 may be made of any suitable materials such as plastic.

The tee connector 1 may have a cylindrical tube 3 for outflow air ventilation. The cylindrical tube 3 may have, at its air-outflow end, a first tubular adjustable part 10. The first tubular adjustable part 10 contains parts which can be tear-off and removed from the cylindrical tube 3. The first tubular adjustable part 10 includes a tear buckle 11 and a conical tube 12. The tear buckle 11 may be pulled away to tear-off and remove parts of the conical tube 12. The conical tube 12 may be connected with a transitional conical tube 17 and a first outflow cylindrical tube 4. The first outflow cylindrical tube 4 has a smaller diameter size than the cylindrical tube 3, and may be tear-off and removed from the first tubular adjustable part 10. The transitional conical tube 17, or an arc-shaped tube, may be positioned between the first outflow cylindrical tube 4 and the conical tube 12. To increase its usage, thereby enabling the tee connector 1 to be connected with multiple types of ventilation pipes, the first outflow cylindrical tube 4 may be equipped with a second tubular adjustable part 20 which contains a second outflow cylindrical tube 5 that has a smaller diameter than, and can be tear-off and removed from, the first outflow cylindrical tube 4.

During installation of the air-conditioner, depending on the sizes and measurements of the ventilation pipes, the first tubular adjustable part 10 and/or the second tubular adjustable part 20 may have none, some, or all of its detachable or tear-able parts removed. When a particular tubular adjustable part has its corresponding outflow cylindrical tube tear-off and removed, the tee connector 1 may be left with a larger-diameter outlet for outflow of air, and the larger outlet may be used to connect with the large-diameter ventilation pipe. The removed parts of the outflow cylindrical tube may not longer be needed.

In one embodiment, in order to be conveniently connected with various ventilation parts such as soft ventilation pipe, easy connector, electric air door, or air blower, the tee connector 1 may have saw-tooth shaped snap-fit points being placed on the outside surface of the cylindrical tube 3, the outflow cylindrical tube 4, and/or the outflow cylindrical tube 5. These snap-fit points may have sufficient width, and may be evenly placed around the surface of the cylindrical tube with their tooth-shaped ends pointing outward.

In one embodiment, for easier installation, a first two-step cylindrical structure may be placed near one end of the first tubular adjustable part 10. The first two-step cylindrical structure may have a large section and a small section each of which is in a cylindrical step-shape. The large section has a larger diameter than the small section. The outer surface of the large section may have one or more snap-fit points 6 evenly distributed around for connecting with a soft pipe. The outer surface of the small section may have one or more snap-fit points 7 evenly distributed around for connecting with other easy connector, electronic air door, and/or airblower. Further, an inflow cylindrical tube 14 of the tee connector 1 may have on its outer surface one or more snap-fit points 8 for connecting with an air inflow soft pipe, and a rectangular slot 15 for connecting with a caliber adapter. In another embodiment, the two sections of the two-step cylindrical structure may have a same diameter, thereby making the two-step cylindrical structure into a one-step cylindrical structure. In this case, the snap-fit points 6 and 7 may be distributed on different axial locations for connecting with corresponding parts and pipes.

In one embodiment, for easy transportation and installation, the tee connector 1 may be configured as two corresponding half-tube parts. Each of the half-tube parts contains a half-tube for air-inflow and a full set of air-out-flow parts (e.g., a corresponding cylindrical tube 3 and its detachable parts), the connecting areas of the half-tube parts may have corresponding interlocking buckles (9) and snap-fit points for linking the two half-tube parts. During transportation, the two half-tube parts may be packages separately. During installation, the two half-tube parts may be unpackaged and connected using the interlocking buckles and snap-fit points to form a whole tee connector 1.

In addition, an optional air block panel may be set in the inflow cylindrical tube 14 of the tee connector 1. The air block panel may be operated manually or by electronic motor, to control the air flowing into the tee connector 1. Also, an on-off switch may be installed at a suitable location on the tee connector 1 to control the air block panel.

In one embodiment, a hanging handle 18, which can be used for hanging the tee connector 1, may also be placed at a suitable location on the outside surface of the tee connector 1.

Embodiment 2, An Easy Connector in a Combined Structure.

The easy connector 40 may be made using any suitable plastic material through manufacturing processes such as mold injection or other methods. The easy connector 40 may be used for connecting two ventilation pipes for an air-conditioner, or connecting any two of the ventilation pipe, tee connector 1, air-collecting compartment, and/or air blower.

The body of the easy connector 40 may be a cylindrical tube 410 having a diameter corresponding to the diameter of a ventilation pipe for an air-conditioner. The outer surface of the cylindrical tube 410 may have four snap-fit structures 41 evenly distributed around the cylindrical tube 410. Each of the snap-fit structures 41 may have a rectangular slot 411 in the wall of the cylindrical tube 410, and a stop block 412 located in the inside surface of the cylindrical tube 410. The snap-fit structure 41 may be used for connecting reducer (for connecting two tubes with different diameters), tee connector 1, air door, and/or air blower. In one embodiment, the cylindrical tube 410 should have even number (e.g., four or six) of the snap-fit structures 41.

A sealing cylindrical ring 47 may be positioned at the middle section of the cylindrical tube 410's outer surface. One or more elastic snap-fit points 42 may be evenly distributed around the outer surface of the top section of the cylindrical tube 410. The elastic snap-fit points 42 may be used for connecting with the PU plastic cover-skin of an air blower. The distance from the top edge of the cylindrical tube 410 to the elastic snap-fit points 42 in an axial direction may depend on the air blower's measurements. For example, the distance may be around 20 mm. For connecting with a metal air blower having a cover-skin thickness of about 1 mm, another set of elastic snap-fit points 43 may be placed below the elastic snap-fit points 42. This way, the easy connector 40 may be configured for connecting with either the thick PU cover-skin air blower, or the thin metal cover-skin air blower. When connecting with the air blower, sealing materials such as sealing cotton may be placed between the air blower and the sealing cylindrical ring 47 for guarantee of the air tightness. Further, when connecting with the thick PU cover-skin blower, the elastic snap-fit points 43 may be bent out of shape. However, this does not impact the fitting of the elastic snap-fit points 42 to the blower. It should be emphasized that the elastic snap-fit points 42 and the elastic snap-fit points 43 may be used to connect not only the air blower, but also various soft ventilation pipes for the air conditioner. In one embodiment, the number of elastic snap-fit points 42 or the elastic snap-fit points 43 should be an even number, preferably four or six.

In one embodiment, the cylindrical tube 410 below the sealing cylindrical ring 47 may have a two-step cylindrical structure 48 having a small section and a large section which are cylindrical shapes with different diameters. The small section, which is positioned at the far end of the two-step cylindrical structure 48, may have on its outer surface one or more snap-fit point 46 for connecting with tee connector 1, air door, and/or air blower. One or more elastic snap-fit points 45, which may be positioned on the outer surface of the large section of the two-step cylindrical structure 48, may be used for connecting with soft pipes. In one embodiment, the elastic snap-fit points 45 and the snap-fit points 46 may be in even number (e.g., four or six).

In one embodiment, the elastic snap-fit points 42, the elastic snap-fit points 43, the elastic snap-fit points 45, and/or the snap-fit points 46 may have a saw-tooth shape with sufficient width. The direction of the saw-tooth shapes for the elastic snap-fit points 42 and the elastic snap-fit points 43 may be opposite to the direction of the saw-tooth shapes of the elastic snap-fit points 45 and the snap-fit points 46.

In conclusion, the easy connector 40, which is configured with the various snap-fit structures and elastic snap-fit points, may be used for connecting the ventilation pipes of an air-conditioner using the elastic snap-fit points 42, the elastic snap-fit points 43, and/or the elastic snap-fit points 45. The one or both ends of the easy connector 40 may also be used for connecting the tee connector 1, the air door, and/or the air blower, using the ring-snap-fit structures 41 and/or the snap-fit points 46. Thus, by using the easy connector 40, it becomes very convenient to make a connection among the soft ventilation pipes of an air-conditioner, the tee connector 1, the air door, and/or the air blower.

In addition, a fixing structure 44 may be placed at a location that is on the outer surface of the cylindrical tube 410 and below the sealing cylindrical ring 47. The fixing structure 44 may be used for installing a control switch for controlling the inflow air block panel.

Embodiment 3, A Caliber Adapter in a Combined Structure.

The caliber adapter 30 may be made using any suitable plastic material through manufacturing processes such as mold injection or other methods. The caliber adapter 30 may be used for connecting two ventilation pipes of air-conditioner with different diameters, or connecting any two of the ventilation pipe, tee connector 1, air-collecting compartment, air blower, and/or another caliber adapter 30.

The body of the caliber adapter 30 may have step-shaped cylindrical structures that are located at both ends of the caliber adapter 30 and correspond to the ventilation pipes that have various diameters. The large-diameter step-shaped cylindrical structure (large-diameter tube) and the small-diameter step-shaped cylindrical structure (small-diameter tube) may be connected through a transitional conical tube 35 or an arc tube. The small-diameter tube may have on its outer surface a two-step outer cylindrical structure 36 which is formed by a large section, and a small section which is located at the end of the small-diameter step-shaped structure 36. One or more snap-fit points 31 may be evenly distributed around the outer surface of the small section, and may be used for connecting the caliber adapter 30 with tee connector 1, air door, and/or air blower. The snap-fit points 31 may also be used to connect one caliber adapter 30 with another caliber adapter 30. One or more snap-fit points 32 may be evenly distributed around the outer surface of the large section, and may be used for connecting the caliber adapter 30 with a soft pipe. The large-diameter tube may have on its inner surface a two-step large-diameter step-shaped structure 37 which is formed by a small section, and a large-section located at the end of the large-diameter step-shaped structure 37 and with a larger inner diameter than the small section. One or more elastic snap-fit points 33 may be evenly distributed around the outer surface of the small section, and may be used for connecting the second end of the caliber adapter 30 with a soft pipe. One or more rectangular slots 34 may be evenly distributed around the wall of the large section, and may be used for connecting the caliber adapter 30 with another caliber adapter 30.

For convenience in manufacturing and installation, the number of the snap-fit points 31 or the snap-fit points 32 for the caliber adapter 30 should be even number. In one embodiment, this number may be four. Likewise, the number of the elastic snap-fit points 33 or the number of rectangular slot 35 should be an even number such as four or six.

The snap-fit points 31 and the corresponding snap-fit points 32 of the caliber adapter 30 may be separated by a specific distance in the caliber adapter 30's axial direction, and may be located at the caliber adapter 30's common radial positions. Likewise, the elastic snap-fit points 33 and the corresponding rectangular slots 34 may be separated by a certain distance in the caliber adapter 30's axial direction, and may be located at the caliber adapter 30's common radial positions.

The height/thickness of the snap-fit points 31 plus the thickness of the above small section of the small-diameter step-shaped structure 36 may be no more than the height/thickness of the large section of the small-diameter step-shaped structure 36. The height/thickness of the rectangular slot 34 plus the thickness of the large section of the large-diameter step-shaped structure 37 may be no less than the height/thickness of the small section of the large-diameter step-shaped structure 37. Such configurations are advantageous when connecting the snap-fit points 32 of the caliber adapter 30 with a soft ventilation pipe, so that the sharp points of the snap-fit points 31 would not scratch the inner surface of the soft ventilation pipe. Also, it may be easier to set the caliber adapter 30 into position in these configurations.

In one embodiment, the snap-fit points 31, the snap-fit points 32, and/or the elastic snap-fit points 33 of the caliber adapter 30 may be in saw-tooth shapes with sufficient width. The direction of the saw-tooth shapes of the snap-fit points 31 and the snap-fit points 32 may be opposite to the direction of the saw-tooth shapes of the elastic snap-fit points 33.

In conclusion, the caliber adapter 30, which is configured with the various snap-fit structures and elastic snap-fit points, may be used for connecting different ventilation pipes with various diameters via the snap-fit points 32 and the elastic snap-fit points 33. One end of the caliber adapter 30 may be used for connecting the tee connector 1, the air door, the air blower, and/or another caliber adapter 30, when the snap-fit points 31 and the rectangular slots 34 are used. Thus, by using the caliber adapter 30, it becomes very convenient to make a connection among the different-diameter soft ventilation pipes of an air-conditioner, the tee connector 1, the air door, and/or the air blower.

Embodiment 4, A Combined Structure Includes a Tee Connector, an Easy Connector, and a Caliber Adapter.

In one embodiment, a tee connector 1 in embodiment 1, an easy connector 40 in embodiment 2, and a caliber adapter 30 in embodiment 3 may be selected for constructing a combined structure.

First of all, by using the rectangular slot 15 of the tee connector 1 and the corresponding snap-fit points of the caliber adapter 30, the caliber adapter 30 may be connected at the air inflow tube 14 of the tee connector 1.

Secondly, by using the snap-fit points 7 of the tee connector 1, the easy connector 40 may be connected at one of the outflow tubes of the tee connector 1.

Lastly, an electronic air door 50 may be installed at the other outflow tube of the tee connector 1 via its snap-fit points 7.

Thus, the combined structure of the tee connector 1 with the easy connector 40 and the caliber adapter 30 is completed.

In other embodiments, the tee connector 1 may be connected with the caliber adapter 30 to form a specific combined structure, the tee connector 1 may be connected with the easy connector 40 to form another combined structure, and/or the tee connector 1 may be connected with an electronic air door 50 to form a further combined structure.

I claim:

1. A combined structure for air-conditioning ventilation, comprising:
    a tee connector (1); an easy connector (40); and a caliber adapter (30), wherein
    the tee connector (1) comprises a cylindrical tube (3) and a first tubular adjustable part (10) located at one end of the cylindrical tube (3), wherein the first tubular adjustable part (10) is adjustable for connecting with an outflow ventilation pipe, the first tubular adjustable part (10) comprises a tear buckle (11) and a conical tube (12) configured for adjusting the first tubular adjustable part (10), a small end of the conical tube (12) is connected with a transitional conical tube (17), wherein a first outflow cylindrical tube (4) is connected with a small end of the transitional conical tube (17) and has a smaller diameter than the cylindrical tube (3), and is configured to be torn-off and removed from the conical tube (12), the first outflow cylindrical tube (4) comprises a second tubular adjustable part (20) for connecting with the outflow ventilation pipe, wherein the second tubular adjustable part (20) contains a second outflow cylindrical tube (5) which has a smaller diameter than the first outflow cylindrical tube (4) and is configured to be torn-off and removed from the second tubular adjustable part (20), the easy connector (40) have a cylindrical body (410) with a diameter corresponding to an outflow ventilation pipe's diameter, wherein an outer surface of the easy connector (40) contains a snap-fit structure (41), and a middle section of the cylindrical body (410) is fitted with a sealing cylindrical ring (47), on one side of the sealing cylindrical ring (47) the cylindrical body (410) has on its surface a snap-fit point (42), on another side of the sealing cylindrical ring (47) the cylindrical body (410) has on its surface a two-step cylindrical structure (48) for easy connection, the two-step cylindrical structure (48) has a first section and a second section, with the first section having a smaller outer-diameter than the second section, the first section has on its outer surface a snap-fit point (46), and the second section has on its outer surface an elastic snap-fit point (45), the caliber adapter (30) is formed by a large-diameter tube and a small-diameter tube which are connected by a transitional conical tube (35), the small-diameter tube has on its outer surface a two-step outer cylindrical structure (36) formed by a third section and a fourth section, the third section's outer diameter is smaller than the fourth section's outer diameter, the third section has on its outer surface an elastic snap-fit point (31), and the fourth section has on its outer surface an snap-fit point (32) for connecting with a soft pipe, the large-diameter tube has on its inner surface a two-step inner cylindrical structure (37) formed by a fifth section and a sixth section, the fifth section's inner diameter is larger than the sixth section's inner diameter, the sixth section has on its outer surface an elastic snap-fit point (33) for connecting with the soft pipe, and the fifth section has on its outer face a rectangular slot (34), and the easy connector (40) is connected with the cylindrical tube (3), and the caliber adapter (30) is connected with an inflow cylindrical tube (14) of the tee connector (1).

2. The combined structure according to claim 1, wherein one end of the first tubular adjustable part (10) contains a seventh section and an eighth section both of which are in a cylindrical step-shape, wherein the seventh section has a smaller diameter than the eighth section, an outer surface of the eighth section contains a snap-fit point (6) configured for connecting with the soft pipe, an outer surface of the seventh section contains a snap-fit point (7) configured for connecting with the easy connector (40), and an outer surface of an inflow cylindrical tube (14) of the tee connector 1 contains a snap-fit point (8) which is configured for connecting with an inflow soft pipe, and a slot (15) for connecting with the caliber adapter (30).

3. The combined structure according to claim 2, wherein the snap-fit point (31) of the caliber adapter (30) is configured to be clamped into the slot (15) of the inflow cylindrical tube (14) for connecting the caliber adapter (30) with the tee connector (1), and the snap-fit point (46) of the easy connector (40) is configured to be fastened with the snap-fit point (7) for connecting the easy connector (40) with the tee connector (1).

4. The combined structure according to claim 2, wherein the snap-fit point (7) is configured for connecting an electric air door (50) with the first outflow cylindrical tube (4) of the tee connector (1).

5. The combined structure according to claim 1, wherein the tee connector (1) is configured as two half-tube parts each of which contains half of the corresponding cylindrical tube (3), the two half-tube parts are attached using a buckle (9), each of the half-tube parts has a half-tube for air-inflow and the half of the corresponding cylindrical tube (3) for air outflow, the two half-tubes of the half-tube parts are connected using interlocking buckles.

6. The combined structure according to claim 1, wherein a hanging handle (18) is placed at a suitable location on an outer surface of the tee connector (1).

7. The combined structure according to claim 3 wherein,

A number of the third section snap-fit points (31) used for connecting the tee connector 1 and a number of the forth section snap-fit points (32) used for connecting the outflow ventilation pipe is four respectively, and a number of the sixth section elastic snap-fit points (33) and a number of the fifth section rectangular slots (34) is four respectively, The third section snap-fit point (31) and the forth section snap-fit point (32) are separated by a first specific distance in an axial direction, and the third section snap-fit point (31) and the forth section snap-fit point (32) are located at common radial positions, and The sixth section snap-fit point (33) and the fifth section rectangular slot (34) are separated by a second specific distance in the axial direction, and the sixth section elastic snap-fit point (33) and the fifth section rectangular slot (34) are located at common radial positions.

8. The combined structure according to claim 3, wherein, a thickness of the third section plus a height of the third section snap-fit point (31) is no more than a thickness of the fourth section, a height of the fifth section square slot (34) plus the height of the fifth section is no less than a height of the sixth section.

9. The combined structure according to claim 3, wherein the snap-fit structure (41) of the easy connector (40) comprises a rectangular slot (411) in the cylindrical body (410), and a stop block (412) on the inner surface of the cylindrical body (410).

10. The combined structure according to claim 3, wherein, an elastic snap-fit point (43) used for clamping a body of an air-collecting compartment is located at an outer surface of the easy connector (40), located in a suitable axial distance away from, and at a same side of the sealing cylindrical ring (47) of the cylindrical body 410 as, the snap-fit point (42).

\* \* \* \* \*